Dec. 31, 1968 E. B. BELL 3,419,716
DEVICE FOR MEASURING THE CONCENTRATION OF SUBSTANCES IN LIQUIDS
Filed Sept. 2, 1964
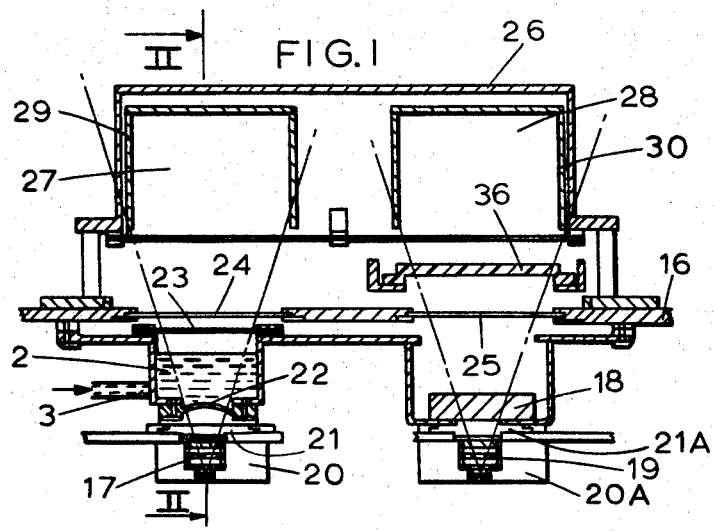
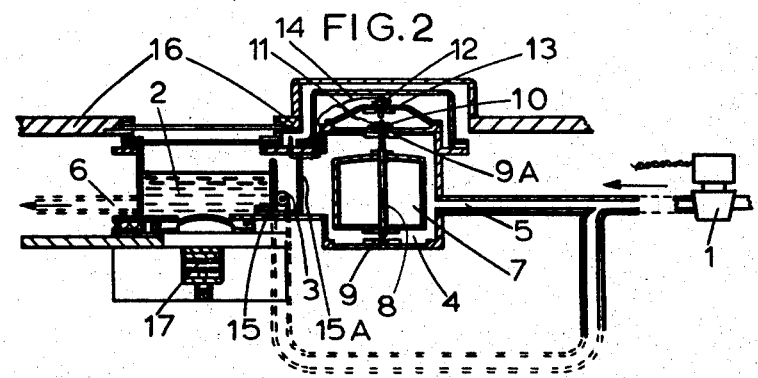
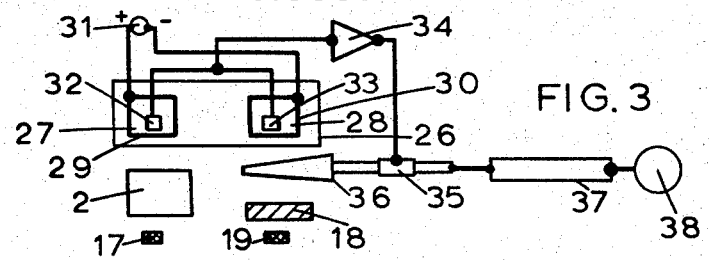

United States Patent Office 3,419,716
Patented Dec. 31, 1968

3,419,716
DEVICE FOR MEASURING THE CONCENTRATION OF SUBSTANCES IN LIQUIDS
Eric B. Bell, West Byfleet, England, assignor to Saunders-Roe Developments Limited
Filed Sept. 2, 1964, Ser. No. 393,915
Claims priority, application Great Britain, Sept. 14, 1963, 36,272/63
5 Claims. (Cl. 250—43.5)

ABSTRACT OF THE DISCLOSURE

A device for measuring the concentration of substances in a liquid by nucleonic radiation is provided with a float means which ensures that the mass of liquid measured is of constant mass irresective of its density. A mass of liquid is introduced between a radiation source and a radiation detector and the float functions to regulate the level of the liquid between same such that the mass of liquid introduced into the device for a given measurement will always be the same regardless of its density. In this manner, concentration measurements can be made by radiation techniques without error introduced by density variations.

---

This invention relates to nucleonic concentration measurement of liquids, and more particularly to density compensation of such measurements.

In the past, nucleonic concentration measurement of liquids comprising a known number of constituents has been carried out in particular by the placing of a known quantity of liquid between a radiation source and a radiation detector. The said liquid, acting as a radiation absorber, allows only a reduced quantity of radiation to be received by the detector. The radiation absorbed by the liquid depends upon three quantities, first, the total mass of liquid per unit area within the radiation beam between the source and the detector, second, the individual mass absorption coefficients, and third, the concentrations of the constituents in the liquid. The radiation reaching the detector can be expressed in an equation in the form:

$$1 = 1_o e^{(-\mu_1 C_1 + \mu_2 C_2 + \ldots \mu_2 C_2)m}$$

where 1 relates to the radiation reaching the detector, $1_o$ relates to the radiation leaving the source in a given time, $\mu$ relates to the mass absorption coefficients of the given constituents, C relates to the concentration of a given constituent by weight per weight of the total liquid and relates to the total mass of the radiation path in the liquid per unit area.

It is further seen that the total of the concentrations of each constituent must equal the concentration of the whole which must be unity, as shown in the equation:

$$C_1 + C_2 + \ldots C_2 = 1$$

In many cases it is required to know the concentration of a constituent in a two component mixture of liquid. Thus these two equations give by combination a relationship, as follows:

$$1 = 1_o e^{-(C_1(\mu_1 - \mu_2) + \mu_2)m}$$

If the density of the liquid is known then the value for $m$ may be found, thus allowing a solution to be obtained from this equation, for the concentration of the constituent $C_1$ in the two component mixture.

When it is necessary to determine the concentration $C_1$ of a constituent in a two component mixture, during a flow process, the density of the liquid within the test area may vary, thus the total value of the mass of the radiation path in the liquid per unit area $m$ may not be regarded as a constant value.

It is, therefore, an object of the invention to provide a nucleonic concentration measuring device for liquids that is compensating in respect of density changes such that the concentration of a constituent in a two component mixture of a liquid may be determined.

According to the present invention, a concentration measuring device for liquids is provided including a radiation source, a radiation detector and a member buoyant in the liquid, said buoyant member providing means to regulate the mass of liquid between said radiation source and said radiation detector, so that the amount of radiation received by said detector may be used to determine component concentrations of the liquid substantially independent of density changes in the liquid.

A preferred embodiment of the invention is an instrument used to determine the concentration of sulphur in petroleum products. This embodiment will be described by way of example only, with reference to the accompanying drawings in which:

FIGURE 1 shows a first vertical cross-section of the instrument.

FIGURE 2 shows a second vertical cross-section of the instrument taken along the line II—II in FIGURE 1.

FIGURE 3 shows a diagrammatic representation of the interrelation of components in the instrument.

Figure 4:
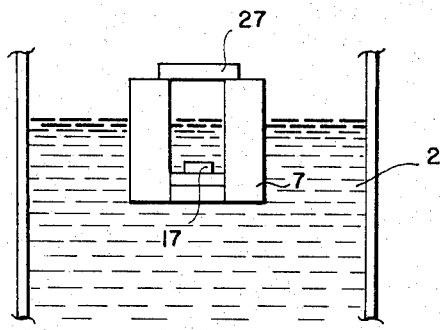
FIGURES 4 and 5 are diagrammatic representations of alternative embodiments of the invention.

In operation of the preferred embodiment of the invention, liquid for test is diverted from a main conduit pipe, for example, a 12" pipeline carrying the liquid at a pressure of 200 lbs. per square inch, and the pressure is reduced to about 3 lbs. per square inch. The diverted liquid enters the instrument through a solenoid controlled valve 1 as shown in FIGURE 2, and is divided to feed a sample chamber 2 through a sample chamber inlet 3, and a buoyancy chamber 4 through a buoyancy chamber inlet 5. Chambers 2 and 4 are provided with a suitable vent. The liquid flows through the chambers 2 and 4 and out through a common outlet 6 in the sample chamber 2 to a collecting vessel for pumping back to the main conduit.

When passing through the buoyancy chamber 4 the liquid rises around a float 7 until a weight of liquid equal to the weight of the float is displaced, when the float will become buoyant and rise with any further inflow of liquid. A vertical spindle 8 is fixed through the axis of the float 7 to rise and fall with the float 7, and to position it by working between bearings 9 and 9A. The upper end of the spindle 9 forms an electrical contact 10 and is connected to an electrical supply through a flexible insulated wire 11. When the liquid causes the float 7 and spindle 8 to rise, the spindle contact 10 engages with a contact set screw 12 mounted in an insulating support 13 supported by the float chamber body. The contact set screw 12 is connected through an insulated wire 14 to the aforementioned electrical supply by way of an input to a current amplifier (not shown). Engagement of the spindle contact 10 with the contact set screw 12 points current of the order of 1 mirco ampere to flow through the input of the current amplifier, where the current is boosted to a degree sufficient to operate the solenoid valve 1 and shut off the supply of liquid to the sample chamber 2 and the buoyancy chamber 4. It can be seen that the float 7 will operate through the contacts 10 and 12, amplifier and solenoid valve 1 to control the level of the liquid within the buoyancy chamber 4 and sample chamber 2. As the mass of the float assembly is contant the mass of liquid displaced by the float 7 when the float becomes buoyant will be constant. Accordingly the float 7, by causing the solenoid valve 1 to operate when it becomes buoyant, will maintain a substantially constant mass of liquid within the two chambers 2 and 4 irrespective of the density of the liquid, although the volume and consequently the level will vary to be inversely proportional to changes in density.

The two liquid inlets 3 and 5 and perforated baffle plates 15 and 15A interconnecting the two chambers 2 and 4 are provided to improve the distribution of the liquid flow within the chambers 2 and 4, and also to minimise the disturbance of the liquid surface occasioned by operation of the solenoid valve 1. The travel of the float 7 and spindle 8 is limited to a few thousandths of an inch further, to avoid disturbance of the liquid surface.

The insulated wires 11 and 14 are led to the amplifier by way of a plug connection (not shown) through a bulkhead 16 and with the contacts 10 and 12 form the whole electrical circuitry on the side of the bulkhead where liquid is to be found, in order to minimise the fire hazards with inflammable liquids.

The constant mass per unit area of liquid in the sample chamber 2 is irradiated from a source of radiation 17 and the radiation received through the liquid is compared with those received through a simulator window 18 (FIGURE 1) from a comparator source of radiation 19 which produces radiations similar to the first source 17.

The radiation sources 17 and 19 are shielded by shrouds 20 and 20A to avoid external radiation and collimate the required radiations towards the liquid in the sample chamber 2 and the simulator window 18. Sliding shields 21 and 21A are provided to cut off radiations from the sources 17 and 19 when the instrument is not in use.

Radiations from the source 17 pass through sealed windows 22 and 23 into and out of the sample chamber 2, and pass from both sources 17 and 19 through windows 24 and 25 in the safety bulkhead 16. These windows 22, 23, 24 and 25 and the simulator window 18 are preferably made of a plastic resistant to petroleum products or other liquids to be tested in the instrument and do not contain nitrogen chlorine or sulphur, as these elements would tend to interfere with the operation of the instrument. A suitable plastic material is Delrin, a registered trade name of Du Pont Limited.

The radiations from both sources 17 and 19, after passing through the bulkhead windows 24 and 25, enter a sealed container 26 enclosing a gas common to two ion chamber detectors 27 and 28 within the container 26.

The ion chamber detectors 27 and 28 are shown diagramatically in FIGURE 3 and take the form of two outer plates 29 and 30 connected to opposite potentials of a direct current voltage source 31 and two inner plates 32 and 33 coupled together electrically, and having a centre tapping connected to the input of an amplifier 34.

In operation, if the radiations received by the ion chamber detector 27 through the liquid in the sample chamber 2 are equal to the radiations received by the other ion chamber detector 28 from its associated source through the simulator window 18 then both ion chamber detectors 27 and 28 will pass an equal current and no signal will be transmitted to the amplifier 34. But if the radiations received by the detectors 27 and 28 are unequal, then the currents flowing through the detectors will be unequal and a signal will be transmitted to the amplifier with a current direction or sense, depending upon which ion chamber is receiving the greater amount of radiation.

The sensed current is amplified and fed to operate a servo actuator 35 which inserts or withdraws a wedge 36 (seen also in FIGURE 1) of radiation absorbent material situated between the simulator window 18 and the radiation detector 28 to present a greater or lesser thickness of absorbent material to the radiations, and thereby attenuate or increase the radiation transmitted through the wedge to its associated detector 28, in order to balance the radiations received by the two detectors 27 and 28, and thereby terminate the signal from the inner plates 32 and 33 to the amplifier and accordingly halt the servo actuator 35 and movement of the wedge 36.

Also coupled to the servo actuator 35 is the slider or a potentiometer 37 so that movements of the servo actuator are reflected in the voltage output of the potentiometer 37. This potentiometer voltage output is displayed on a visual indicator 38, the reading of which will be dependent upon the position of the servo actuator 37 and consequently of the wedge 36. The position of the wedge 36 depends upon the comparison or balance of the radiations received by the ion chamber detectors 27 and 28; this balance depends upon the radiations absorbed by the liquid in the sample chamber 2 compared with the radiations absorbed by the simulator window and the wedge 36. The radiations absorbed by the liquid are dependent upon the concentrations of the constituents, as defined in the equation given hereinbefore, and can be related to one component in a two component mixture, or to one component of particular interest which is a variable in a mixture of other components which have concentrations in substantially constant ratio one with another. In the present example, the concentration of sulphur in petroleum products.

Thus the concentration of one component in the liquid, and in particular of the sulphur in the petroleum in the preferred embodiment, will cause variations in the voltage displayed on the visual indicator 38, and the visual indicator 38 may be calibrated accordingly to give a reading of the concentration of the component under test.

Figure 5:
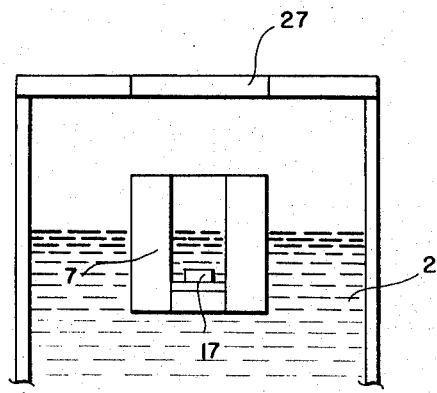

It will be obvious to those skilled in the art that numerous modifications and variations may be made to the instrument hereinbefore described whilst still remaining within the scope of the invention. Any float regulation device may be used to maintain a constant mass of liquid under test between a source of radiation and a detector, in order to determine constituent concentrations in the liquid. For example, a source could be carried on a buoyant member floating on a free surface of the liquid whose component concentrations are to be measured. The source would be mounted to be carried below the surface of the liquid, for example, on the bottom of the buoyant member and adapted to direct radiations towards a detector mounted either on the part of the buoyant member above the surface of the liquid as shown in FIGURE 4, or attached to a fixed part of the liquid container above the surface of the liquid as shown in FIGURE 5. A change in the density of the liquid will cause a corresponding change in the depth of immersion of the buoyant member, in order to maintain a constant mass between the radiation source and the detector.

It will also be appreciated that the entire apparatus could be arranged to work automatically, and for readings to be recorded in like manner.

I claim as my invention:

1. A device for measuring the concentration of a substance in a liquid comprising (a) radiation source means, (b) radiation detector means, means to introduce a liquid between said radiation source means and said radiation detector means, a float buoyant in said liquid and positioned in said device to be floated by said liquid, the level of said liquid introduced between said radiation source and detector being controlled by the height to which said float is raised by the flotation thereof to provide a mass of said liquid between said radiation source and said radiation detector, said mass of introduced liquid being a constant independent of the density thereof, said radiation source means and said radiation detector means being spaced apart a pre-determined distance when said constant mass of said liquid is present between said radiation source means and said radiation detector means, said pre-determined distance being a constant irrespective of the density of said liquid.

2. A device according to claim 1 wherein said radiation source means is mounted on a lower part of said float beneath said liquid level.

3. A device according to claim 2 wherein said radiation detector means is mounted on an upper part of said float above said liquid level.

4. A device according to claim 1 wherein said radiation source means and radiation detector are positioned a fixed distance apart on opposite sides of a liquid-receiving chamber and wherein said device includes means actuated by said float to control the amount of liquid introduced into said liquid-receiving chamber, whereby the mass of fluid provided between said radiation source and said radiation detector is a constant independent of the density thereof.

5. A device for measuring the concentration of a substance in a liquid comprising first and second liquid receiving chambers, conduit means joining said chambers to equalize liquid level therein, radiation source means and radiation detection means disposed a fixed distance apart on opposite sides of said first chamber, a float member buoyant in said liquid and positioned in said second chamber, inlet means to introduce said liquid into said device to provide liquid in said first and second chambers, valve means controlling the flow of liquid through said inlet means, and means actuated by said float to close said valve whereby the mass of fluid introduced into the first chamber of said device is a constant independent of the density of the liquid.

References Cited

UNITED STATES PATENTS

| | | | |
|---|---|---|---|
| 841,213 | 1/1907 | Akins | 4—27 |
| 2,898,466 | 8/1959 | Lintz et al. | 250—43.5 |
| 2,923,158 | 2/1960 | Reynolds | 250—43.5 X |
| 2,965,753 | 12/1960 | Reynolds et al. | 250—43.5 |
| 3,280,327 | 10/1966 | Amrehn | 250—43.5 |

FOREIGN PATENTS 1,056,392  4/1959  Germany.

RALPH G. NILSON, *Primary Examiner.*

S. ELBAUM, *Assistant Examiner.*

U.S. Cl. X.R.

73—221, 434; 4—27; 250—45